US011941945B2

(12) United States Patent
Davis

(10) Patent No.: US 11,941,945 B2
(45) **Date of Patent: *Mar. 26, 2024**

(54) GAMING DEVICE WITH PLAYER CHOICE RANDOMISED BASED ON GAME PLAY OUTCOME

(71) Applicants: Aristocrat Technologies Australia Pty Limited, North Ryde (AU); Aristocrat Technologies, Inc., Las Vegas, NV (US)

(72) Inventor: Blake Davis, Las Vegas, NV (US)

(73) Assignees: Aristocrat Technologies Australia Pty Limited, North Ryde (AU); Aristocrat Technologies, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/049,511

(22) Filed: Oct. 25, 2022

(65) Prior Publication Data

US 2023/0146864 A1 May 11, 2023

Related U.S. Application Data

(63) Continuation of application No. 16/878,343, filed on May 19, 2020, now Pat. No. 11,521,464.

(30) Foreign Application Priority Data

Mar. 3, 2020 (AU) ................................ 2020900626

(51) Int. Cl.

*G07F 17/32* (2006.01)
*G07F 17/34* (2006.01)

(52) U.S. Cl.

CPC ...... *G07F 17/3262* (2013.01); *G07F 17/3213* (2013.01); *G07F 17/3267* (2013.01);

(Continued)

(58) Field of Classification Search

CPC ............. G07F 17/3227; G07F 17/3244; G07F 17/326; G07F 17/3267

See application file for complete search history.

(56) References Cited

U.S. PATENT DOCUMENTS 8,398,475 B2 * 3/2013 De Waal ................ G07F 17/32 463/16
8,876,590 B2 11/2014 Hughes (Continued)

OTHER PUBLICATIONS

"5 Dragon Mystery Choice" Slot video screenshots. [retrieved on May 19, 2020]. Retrieved from the Internet: <URL: https://www.youtube.com/watch?v=7u5KatLMjqY>, (2020), 4 pages.

(Continued)

*Primary Examiner* — Dmitry Suhol
*Assistant Examiner* — Jason Pinheiro
(74) *Attorney, Agent, or Firm* — Blank Rome LLP

(57) ABSTRACT

An electronic gaming machine and method of operation including presenting a spinning reel based game and feature game, includes presenting a feature stage determined in response to multiple individually selectable gameplay options. One of the presented options includes multiple variables unknown to the player at the time of selection. Values for the multiple variables may be determined in response to an outcome established prior to presenting the multiple gameplay options.

20 Claims, 14 Drawing Sheets

(52) U.S. Cl.
CPC ........ *G07F 17/3239* (2013.01); *G07F 17/329* (2013.01); *G07F 17/3293* (2013.01); *G07F 17/34* (2013.01)

(56) References Cited

U.S. PATENT DOCUMENTS

| | | | | |
|---|---|---|---|---|
| 2002/0107066 | A1* | 8/2002 | Seelig | G07F 17/3244 463/20 |
| 2009/0124339 | A1* | 5/2009 | Barton | G07F 17/3267 463/20 |
| 2015/0221176 | A1 | 8/2015 | Meyer | |
| 2016/0086431 | A1* | 3/2016 | Berman | G07F 17/3286 463/20 |

OTHER PUBLICATIONS

Office Action (Non-Final Rejection) dated Mar. 25, 2022 for U.S. Appl. No. 16/878,343 (pp. 1-9).
Office Action (Notice of Allowance and Fees Due (PTOL-85)) dated Aug. 1, 2022 for U.S. Appl. No. 16/878,343 (pp. 1-14).

* cited by examiner

300

| | Reel strip position | Reel 1 (341) | Reel 2 (342) | Reel 3 (343) | Reel 4 (344) | Reel 5 (345) |
|---|---|---|---|---|---|---|
| 301 | 1 | COR | 10 | Pic 3 | COR | Pic 1 |
| 302 | 2 | K | Q | K | COR | 10 |
| 303 | 3 | J | COR | 10 | COR | A |
| 304 | 4 | Scat | Pic 1 | Pic 2 | Scat | Wild |
| 305 | 5 | Q | A | Q | Pic 2 | Pic 2 |
| 306 | 6 | 10 | Pic 2 | COR | J | A |
| 307 | 7 | COR | Pic 4 | COR | Pic 1 | Q |
| 308 | 8 | COR | J | Wild | K | Pic 3 |
| 309 | 9 | A | Q | 10 | Q | 9 |
| 310 | 10 | 9 | A | Pic 1 | K | J |
| 311 | 11 | Pic 2 (351) | Pic 3 | 9 | Pic 4 | COR |
| 312 | 12 | 10 (352) | 9 | Pic 3 | Pic 1 | COR |
| 313 | 13 | Pic 1 (353) | COR | A | Q | COR |
| 314 | 14 | Pic 3 | COR | Q | Pic 4 | Pic 4 |
| 315 | 15 | K | Scat | COR | Pic 2 | 9 |
| 316 | 16 | K | 10 | COR | 9 | Scat |
| 317 | 17 | J | Wild | COR | A | K |
| 318 | 18 | COR | Pic 2 | Scat | COR | Pic 1 |
| 319 | 19 | COR | Q | Pic 2 | 10 | COR |
| 320 | 20 | COR | Q | J | K | COR |
| 321 | 21 | 10 | Pic 3 | Pic 3 | Pic 3 | K |
| 322 | 22 | J | J | Pic 4 | Pic 3 | Pic 2 |
| 323 | 23 | Pic 3 | K | K | 10 | Q |
| 324 | 24 | 9 | 9 | 10 | J | K |
| 325 | 25 | Pic 4 | COR | 9 | Pic 1 | Pic 3 |
| 326 | 26 | A | COR | COR | COR | Pic 4 |
| 327 | 27 | 10 | COR | Q | COR | Pic 4 |
| 328 | 28 | Pic 4 | K | Pic 2 | Wild (331) | 10 |
| 329 | 29 | 9 | 10 | J | Q | COR |
| 330 | 30 | Q | Q | Pic 4 | K | J |

*FIG. 3*

600

| | Reel strip position | Reel 1A | Reel 2A | Reel 3A | Reel 4A | Reel 5A |
|---|---|---|---|---|---|---|
| | | 641 | 642 | 643 | 644 | 645 |
| 601 | 1 | Scat2 | | | | Scat2 |
| 602 | 2 | | Scat2 | Scat2 | | Scat2 |
| 603 | 3 | | | Scat2 | | Scat2 |
| 604 | 4 | Scat2 | | | Scat2 | |
| 605 | 5 | Scat2 | | | | |
| 606 | 6 | Scat2 | | | | |
| 607 | 7 | | | | | |
| 608 | 8 | | Scat2 | | | |
| 609 | 9 | Scat2 | Scat2 | | Scat2 | Scat2 |
| 610 | 10 | | Scat2 | | Scat2 | |
| 611 | 11 | | | | | Scat2 |
| 612 | 12 | | | | | Scat2 |
| 613 | 13 | Scat2 | | Scat2 | | Scat2 |
| 614 | 14 | Scat2 | | Scat2 | | |
| 615 | 15 | | Scat2 | Scat2 | | |
| 616 | 16 | | | | Scat2 | |
| 617 | 17 | | | | Scat2 | |
| 618 | 18 | Scat2 | | Scat2 | Scat2 | |
| 619 | 19 | Scat2 | Scat2 | | | |
| 620 | 20 | Scat2 | Scat2 | | | Scat2 |
| 621 | 21 | | | | | Scat2 |
| 622 | 22 | | | | | |
| 623 | 23 | Scat2 | Scat2 | | | |
| 624 | 24 | | | Scat2 | Scat2 | Scat2 |
| 625 | 25 | | | | | |
| 626 | 26 | | | | | |
| 627 | 27 | Scat2 | Scat2 | | | |
| 628 | 28 | Scat2 | Scat2 | | | |
| 629 | 29 | | Scat2 | | | |
| 630 | 30 | | | | | |

*FIG. 6*

700

741

| | Reel strip position | Reel 1 |
|---|---|---|
| 301 | 1 | COR |
| 302 | 2 | COR |
| 303 | 3 | COR |
| 304 | 4 | COR |
| 305 | 5 | COR |
| 306 | 6 | COR |
| 307 | 7 | COR |
| 308 | 8 | COR |
| 309 | 9 | COR |
| 310 | 10 | COR |
| 311 | 11 | COR |
| 312 | 12 | COR |
| 313 | 13 | COR |
| 314 | 14 | COR |
| 315 | 15 | COR |
| 316 | 16 | COR |
| 317 | 17 | COR |
| 318 | 18 | COR |
| 319 | 19 | COR |
| 320 | 20 | COR |
| 321 | 21 | COR |
| 322 | 22 | COR |
| 323 | 23 | COR |
| 324 | 24 | COR |
| 325 | 25 | COR |
| 326 | 26 | COR |
| 327 | 27 | COR |
| 328 | 28 | COR |
| 329 | 29 | COR |
| 330 | 30 | COR |

*FIG. 7*

FIG. 9
900
920
910
930
SELECT AN OPTION TO PLAY
8
REPEAT WIN
$30.00
5
RANDOM
REPEAT WIN
$60.00
$90.00
$150.00
5
COLLECT
SPIN
FEATURE

GAMING DEVICE WITH PLAYER CHOICE RANDOMISED BASED ON GAME PLAY OUTCOME

CROSS REFERENCE TO RELATED APPLICATIONS

This application is a Continuation of co-pending U.S. patent application Ser. No. 16/878,343, filed May 19, 2020 and entitled "Gaming Device With Player Choice Randomised Based On Game Play Outcome", which claims priority to Australian Patent Application Serial No. 2020900626, filed Mar. 3, 2020 and entitled "Gaming Device with Player Choice Randomised Based on Game Play Outcome," all of which are incorporated by reference herein in their entirety.

FIELD

The present application relates to a gaming device, method of operating a gaming device and a system.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Described embodiments provide a gaming device, a method of operating a gaming device and a gaming system configured to present the player with a random option where the possible outcomes from the player selecting the random option depend on the outcome of a series of prior game instances. In an embodiment, the possible outcomes are a number of further game instances and a multiplier to apply to awards during the further game instances. In an embodiment, the maximum awardable number of further game instances and the maximum multiplier are both derived from a number of defined symbols selected in the prior game instances.

A described embodiment provides a gaming device comprising a display, a processor, and a memory storing a plurality of reel strips and instructions. When the instructions are executed by the processor, they cause the processor to generate each of a plurality of game outcomes by selecting symbols from the plurality of reel strips for a corresponding plurality of columns of symbol positions, determine a cap value (V) which is both a maximum awardable number of further game instances and a maximum multiplier to apply to any awards made as a result of conduct of the further game instances from a total number (T) of defined symbols selected in the plurality of game outcomes, select a set of game option variants by mapping the determined cap value to one of a plurality of sets of game option variants, wherein, for each set of game option variants, each variant specifies a number of further game instances (N) and a multiplier (M), each variant has an associated probability (P) of the variant being selected, and each value of N and each value of M is an integer less than or equal to V, and wherein each set of game option variants is configured such that $$\sum_{i=1}^{S}(P_i M_i N_i) = V,$$

where S is me number of variants in a respective set of game option variants, control the display to display at least two player selectable options, including a random option and at least one other option where M*N=V, responsive to receipt of a selection of the random option, randomly select a variant from the selected set of game option variants, and conduct the number of game instances of the selected variant including by applying the multiplier of the selected variant to each winning outcome.

Another described embodiment provides a method of operating a gaming device comprising a display and a memory storing a plurality of reel strips. The method comprises generating each of a plurality of game outcomes by selecting symbols from the plurality of reel strips for a corresponding plurality of columns of symbol positions, determining a cap value (V) which is both a maximum awardable number of further game instances and a maximum multiplier to apply to any awards made as a result of conduct of the further game instances from a total number (T) of defined symbols selected in the plurality of game outcomes, selecting a set of game option variants by mapping the determined cap value to one of a plurality of sets of game option variants, wherein, for each set of game option variants, each variant specifies a number of further game instances (N) and a multiplier (M), each variant has an associated probability (P) of the variant being selected, and each value of N and each value of M is an integer less than or equal to V, and wherein each set of game option variants is configured such that $$\sum_{i=1}^{S}(P_i M_i N_i) = V,$$

where S is the number of variants in a respective set of game option variants, controlling the display to display at least two player selectable options, including a random option and at least one other option where M*N=V, responsive to receipt of a selection of the random option, randomly selecting a variant from the selected set of game option variants, and conducting the number of game instances of the selected variant including by applying the multiplier of the selected variant to each winning outcome.

Another described embodiment provides a system comprising one or more processors and one or more memories storing a plurality of reel strips and instructions. When the instructions are executed by the one or more processors, cause the one or more processors to generate each of a plurality of game outcomes by selecting symbols from the plurality of reel strips for a corresponding plurality of columns of symbol positions, determine a cap value (V) which is both a maximum awardable number of further game instances and a maximum multiplier to apply to any awards made as a result of conduct of the further game instances from a total number (T) of defined symbols selected in the plurality of game outcomes, select a set of game option variants by mapping the determined cap value to one of a plurality of sets of game option variants, wherein, for each set of game option variants, each variant specifies a number of further game instances (N) and a multiplier (M), each variant has an associated probability (P) of the variant being selected, and each value of N and each value of M is an integer less than or equal to V, and wherein each set of game option variants is configured such that $$\sum_{i=1}^{S}(P_i M_i N_i) = V,$$

where S is the number of variants in a respective set of game option variants, control a display to display at least two player selectable options, including a random option and at least one other option where M*N=V, responsive to receipt of a selection of the random option, randomly select a variant from the selected set of game option variants, and conduct the number of game instances of the selected variant including by applying the multiplier of the selected variant to each winning outcome.

BRIEF DESCRIPTION OF THE DRAWINGS

FIG. 3 illustrates an example reel strip layout.

FIGS. 6 and 7 illustrate example reel strip layouts.

DETAILED DESCRIPTION

Innovations are described for an electronic gaming device that includes a base game, such as a reel game with spinning reels of symbols, and feature game. The feature game can be triggered by an outcome in the base game. As described in more detail below, the feature game will include one or more stages, in which one stage includes presents a gameplay determined in response to multiple individually selectable gameplay options. One of the presented options includes multiple variables unknown to the player at the time of selection. In selected examples, other presented options include an indicated number of spins and an indicated value parameter (such as one or more fixed values or a multiplier), with an increased value of one relative to the other. In selected examples, the identified multiple unknown variables will include a number of spins and a value parameter. In various examples, values for the for the unknown variables may be determined in response to an outcome established prior to presenting the multiple gameplay options. For example, a number of configurable symbols collected in a collect and spin stage of the feature game may be used to define or select a set of option variants, from which an individual variant may be selected at random, and then used to conduct the feature game stage. As a result, the innovation presents a novel gameplay option; and the option is facilitated by a technical solution including defining multiple option variants, from which an individual variant may be selected for conducting the feature game.

Figure 1:
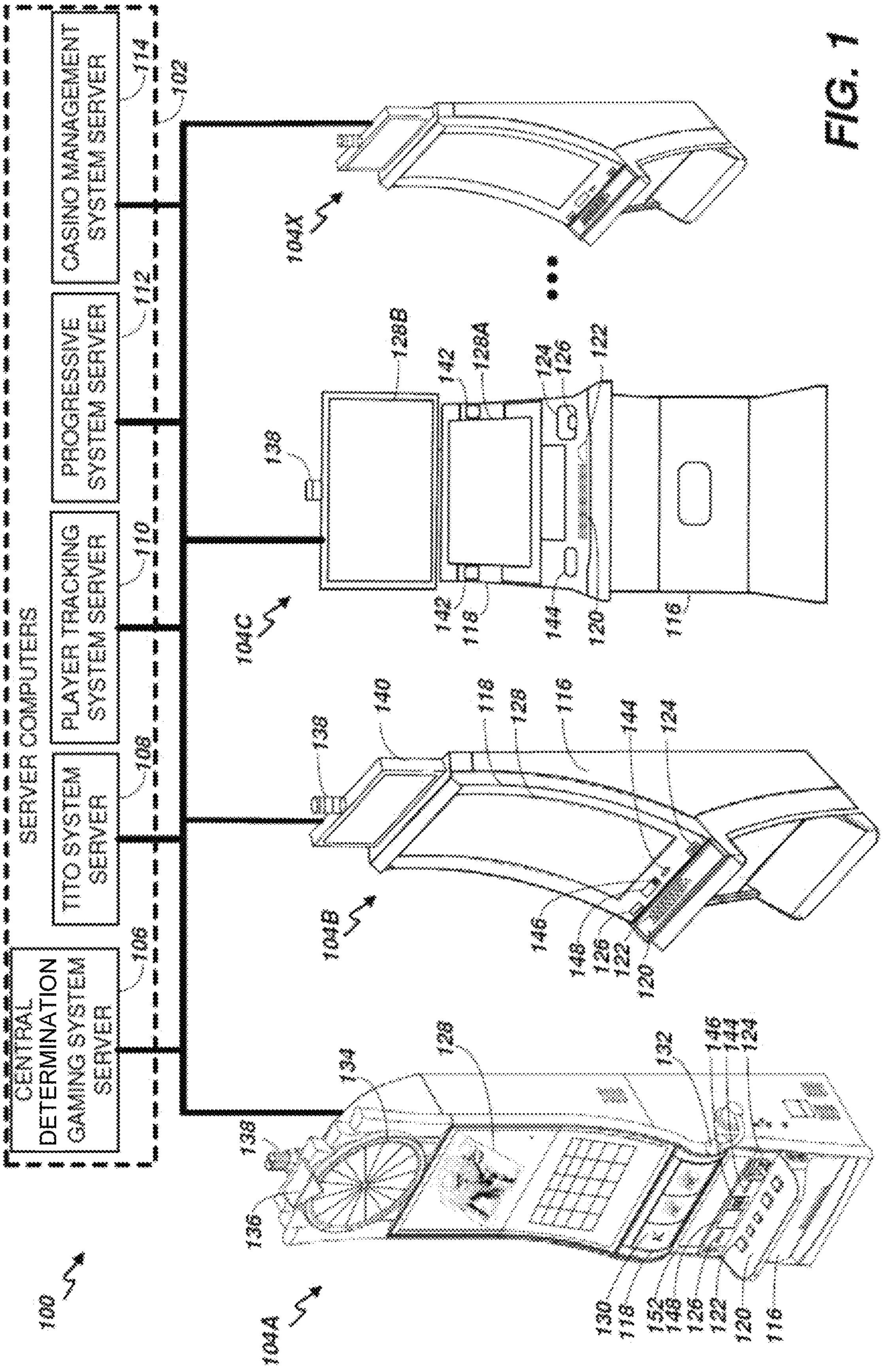
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
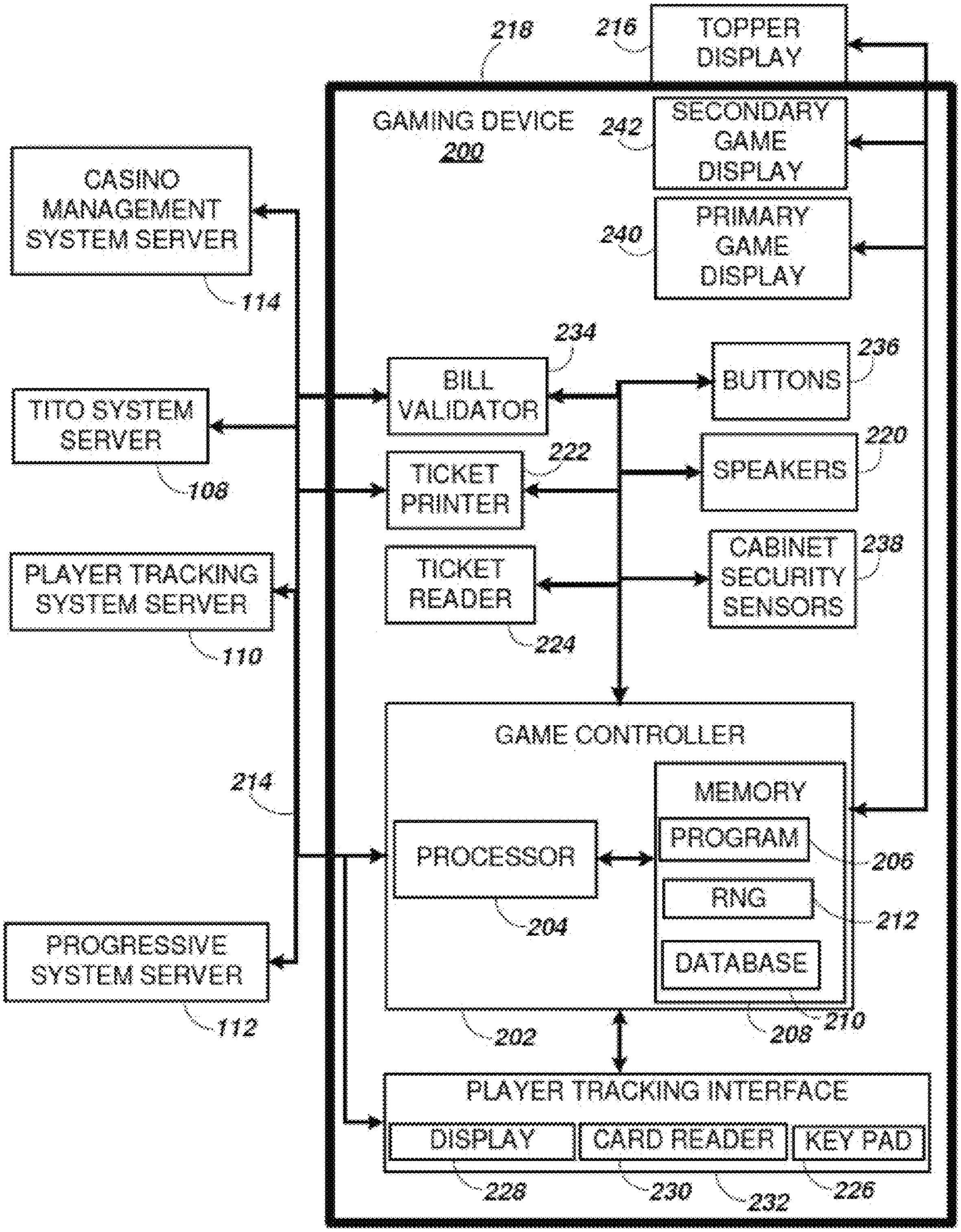
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify, and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudorandom number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment, and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

One regulatory requirement for games running on a gaming device, such as gaming device 200, generally involves complying with a certain level of randomness (e.g., that outcomes will be statistically independent, uniformly distributed over their range, unpredictable and pass statistical tests such as chi-square test, equi-distribution test, gap test, runs test, serial correlation test, etc.). Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG 212 can be integrated into the game controller 202 or processor 204. The RNG operations are often specialized and non-generic in order to comply with regulatory and gaming requirements. For example, in a reel game, program 206 can initiate multiple RNG calls to RNG 212 to generate RNG outcomes, where each RNG call and RNG outcome corresponds to an outcome for a reel. (Gaming regulations may require that each reel outcome be independent of each other reel outcome, such that no reel outcome depends on any other reel outcome.) In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 may include ensuring a certain level of RTP (i.e., "return to player," as described herein). Similar to the randomness requirement discussed above, numerous gaming jurisdictions also mandate that gaming device 200 provides a minimum level of RTP (e.g., RTP of at least 75%).

A game can use one or more weighted tables as part of a technical solution that satisfies regulatory requirements for randomness and RTP. In particular, a weighted table can integrate game features (e.g., trigger events for special modes or bonus games, newly introduced game elements such as extra reels, new symbols, or new cards, stop positions for dynamic game elements such as spinning reels, spinning wheels, or shifting reels, or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts). Configuring a weighted table can involve engineering decisions with respect to how RNG outcomes are mapped to game outcomes for a given game feature, while still satisfying regulatory requirements for RTP. Configuring a weighted table can also involve engineering decisions about whether different game features are combined in a given entry of the weighted table or split between different entries (for the respective game features), while still satisfying regulatory requirements for RTP and allowing for varying levels of game volatility.

To meet a designated RTP, a game developer can utilize one or more weighted tables (e.g., weighted tables) to translate the RNG outcome to a symbol element, stop position on a reel strip layout, and/or randomly chosen aspect of a game feature. As an example, the weighted tables can regulate a prize payout amount for each RNG outcome and how often the gaming device 200 pays out the prize payout amounts. The gaming device 200 could utilize one weighted table to map the RNG outcome to a game outcome displayed to a player and a second weighted table as a payable for determining the prize payout amount for each game outcome. The mapping between the RNG outcome to the game outcome controls the frequency in hitting certain prize payout amounts.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Some embodiments described herein and subsequently shown (e.g., FIGS. 5A-13) represent improvements in the technical area of EGM software and provide new technology, in that they improve usability of EGMs by enhancing the user experience for players, and maintaining the interest of current players in the EGMs. For example, the described improvement includes a feature game gameplay that presents selectable options of two choices, each with different parameter values, including a number of spins parameter and a value parameter (such as a corresponding value or multiplier); and an additional choice in which multiple parameters, for example both the number of spins and the value parameter, are variable, and unknown to the player at the time of selection. This improvement, therefore, further includes game controller functionality to determine values for the multiple variable parameters. In selected examples, a set of multiple variants may be established and/or referenced, each variant including correlated values for each variable parameter; with an associated probability for each of the variants. Thus, the configuration and operation of the EGM game controller is a technical improvement over conventional systems. Various example implementations of the EGM game controller functionality are described below.

Figure 4:
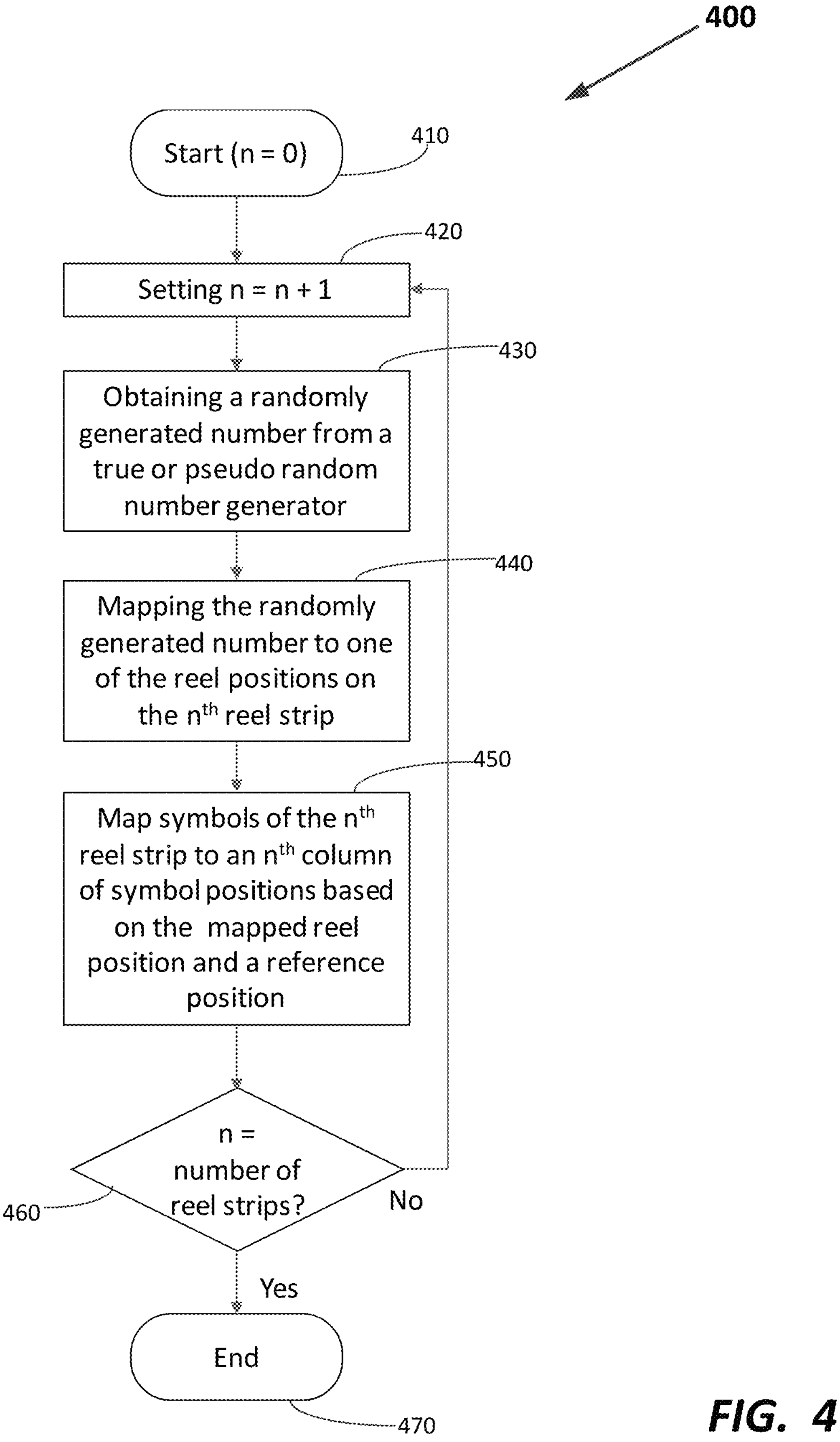
FIG. 4 is a flow chart of a symbol selection method.
Figure 5A:
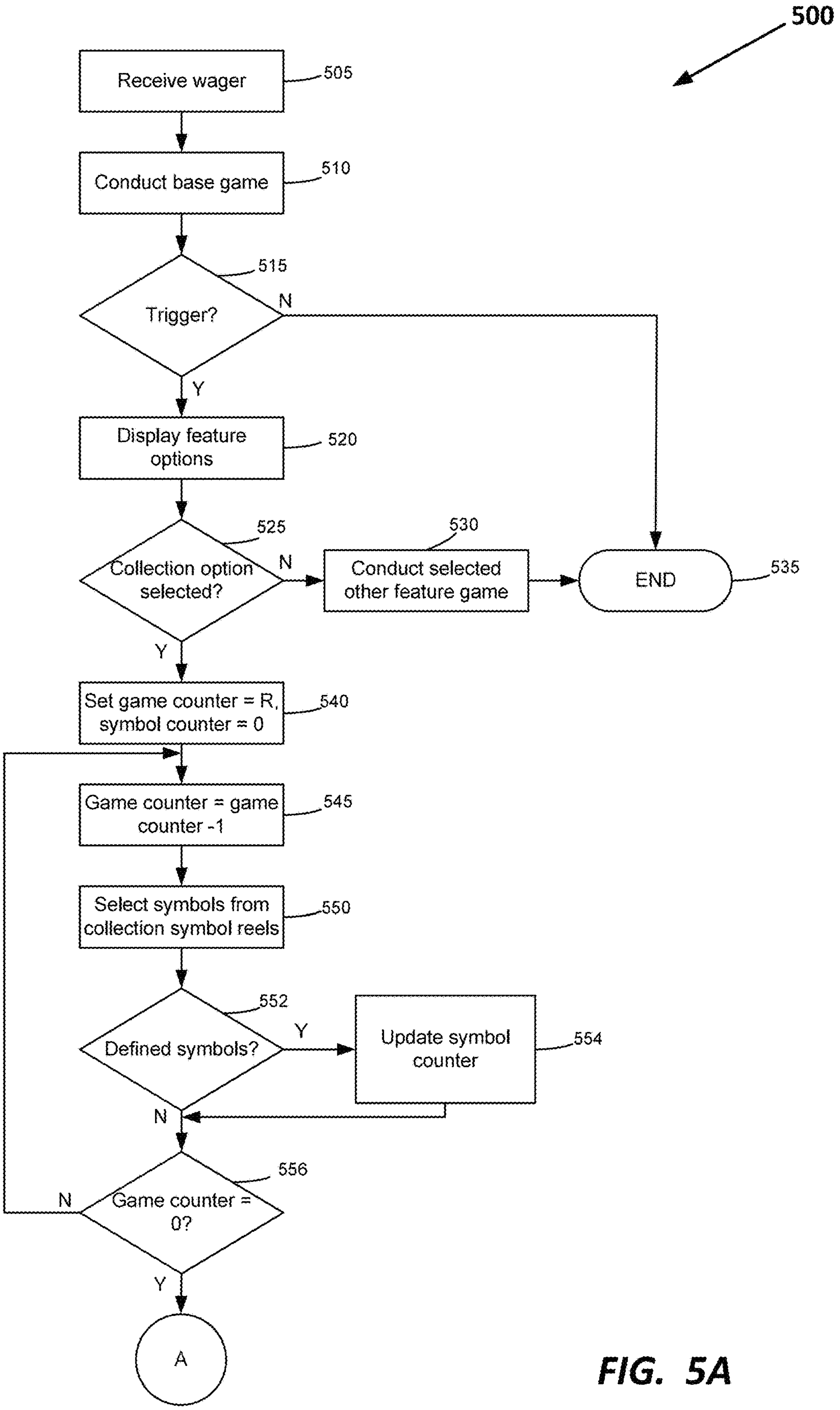
FIGS. 5A and 5B show a flow chart of another method of operating a gaming device.
Figure 5B:
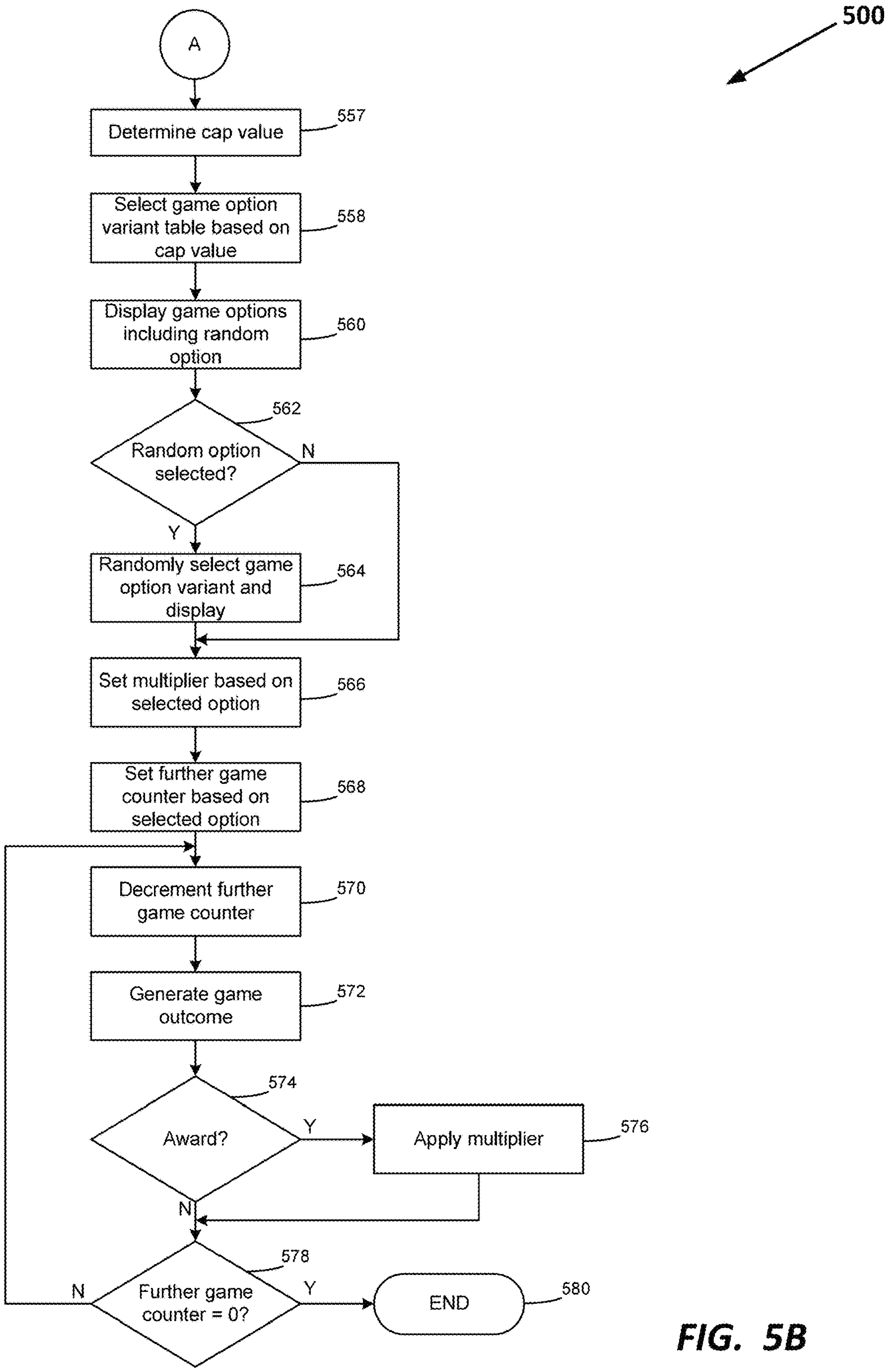

Referring now to FIGS. 5A-5B, the figure illustrates an example method 500 of operating a gaming device 200. The discussion of example method 500 includes operations described in reference to FIGS. 3 and 4. Example method 500 begins at step 505, in which the gaming device receives a wager, for example, in response to a player operating buttons 236.

At step 510, the processor 204 conducts a base game by selecting symbols from base game reel strips stored in memory 208 and evaluating the selected symbols for winning combinations.

FIG. 3 illustrates an example of a set 300 of five reel strips 341, 342, 343, 344, 345. In the example, each reel strip has thirty reel strip positions 301-330. Each reel strip position of each reel has a symbol. For example, a "Wild" symbol 331 occupies the twenty-eighth reel strip position 328 of the fourth reel 344. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual lengths of the game reel strips depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

In this example, each of the reel strips 641-645 have multiple configurable symbols—i.e. the “COR” symbols. COR stands for “Cash on Reels” as in this example each configurable symbol is configured with a prize value by processor 204 when the symbols are selected as described below.

In an example, a symbol configuring data structure in memory 208 stores a weighted table comprising a plurality of assignable prizes—i.e. prizes that can be assigned to individual cash on reel symbols. In an example, the weighted table incorporates a plurality of assignable prizes and different weightings are assigned to each prize in order to control their relative probability of being selected.

In an example, the values of the assignable prizes depend on an amount wagered, for example they correspond to a base amount multiplied by bet multiplier. In an example, the assignable prizes may be credits or otherwise defined prizes such a bonus or jackpot prizes.

The instructions in memory 208 cause processor 204 to conduct an iterative loop in which the processor 204 randomly selects one of the prizes using a value obtained from random number generator 212 and assigns it to the next configurable symbol in reel strip order until all configurable symbols of a reel strip have been assigned a prize. Processor 204 then iterates to the next reel strip and conducts another iterative loop using the weighted table associated with the that strip until all reel strips are configured.

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions above the selected reel position are also mapped to the two symbol positions of the column above the selected reel position. Referring to the example reel strips of FIG. 3, if the value returned by the RNG 212 is mapped to reel position 313, then for the first reel strip 321, “Pic 1” symbol 353 is mapped to a bottom symbol position, “10” symbol 352 is mapped to a middle symbol position, and “Pic 2” symbol 351 is mapped to a top symbol position.

At step 460, the processor 204 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls display 240 to display them at the symbol positions. The processor 204 then evaluates them for winning combinations based on a pay table in the memory.

Referring back to method 500 of FIGS. 5A-5B, at step 515, the processor 204 determines whether a trigger condition is met in respect of the base game, in this example, five or more cash on reel symbols being selected in a game instance trigger the feature. In other examples a different number of cash on reel symbols may trigger the feature; and/or a selected number of cash on reel symbols in combination with another configurable symbol (for example a “Wild” symbol, as shown on FIG. 3 at 331, may trigger the feature. Other combinations of symbols may also be selected to trigger the feature, as will be apparent to persons skilled in the art having the benefit of this disclosure. An example screen display 800 of the feature being triggered is shown in FIG. 8.

Figure 8:
FIGS. 8 to 13 are example screen displays.

As shown in FIG. 8, in this example, three symbols are selected from each of five reel strips for five columns 821-825 of symbol positions thereby also forming three rows 831-833 of symbol positions. The upper part of the display has current prize values 801-804 for a grand jackpot 801, major jackpot 802, minor bonus 803, and mini bonus 804. Five cash on reel symbols 841-845 have been selected which have values of 1000 or 500 credits which satisfy the trigger conditions.

Referring back to method 500, at step 520, responsive to the trigger condition being met (at 515), the method identifies at 525 whether a collection option (i.e., a Collect and Spin game, as further described below) has been selected. If a collection option has not been selected, the processor proceeds to step 530 and controls the display to display a feature selection screen 900 such as that shown in FIG. 9.

Feature selection screen 900 presents a message to the player that instructs the player to “Select an Option to Play.” Feature selection screen 900 presents three selectable options, including a first option 910 where the player will be awarded 8 Free Games with a repeat win of $30, a second option 920 where the player will be awarded 5 Free Games with a random repeat win of $60, $90 or $150, and a third option 930 where the player will be awarded 5 Free Games of a Collect and Spin Feature. This presentation of three player-selectable options provides a degree of control by the player, to increase the player’s interest in the game by allowing the player to select how the gameplay will continue. This involvement in controlling the gameplay provides more satisfactory gaming experience for the player. Additionally, the availability of a Collect and Spin feature introduces an additional degree of variability (as discussed below) to provide the potential of greater rewards (in terms of additional spins and/or increased credit awards) to provide greater variability in the gameplay, and thus less predictability, again improving the player's gaming experience.

The processor 204 determines at step 525 whether the collection option has been selected (here, Option 3 (930)) and if not (i.e. the player selects Option 1 or Option 2), the processor 204 proceeds to step 530 and conducts the selected feature before the game ends at step 535. In this example, by conducting a number of game instances and if a specific symbol (or symbol combination) occurs in a game instance, the repeat win amount is awarded.

Figure 9:
Figure 10:
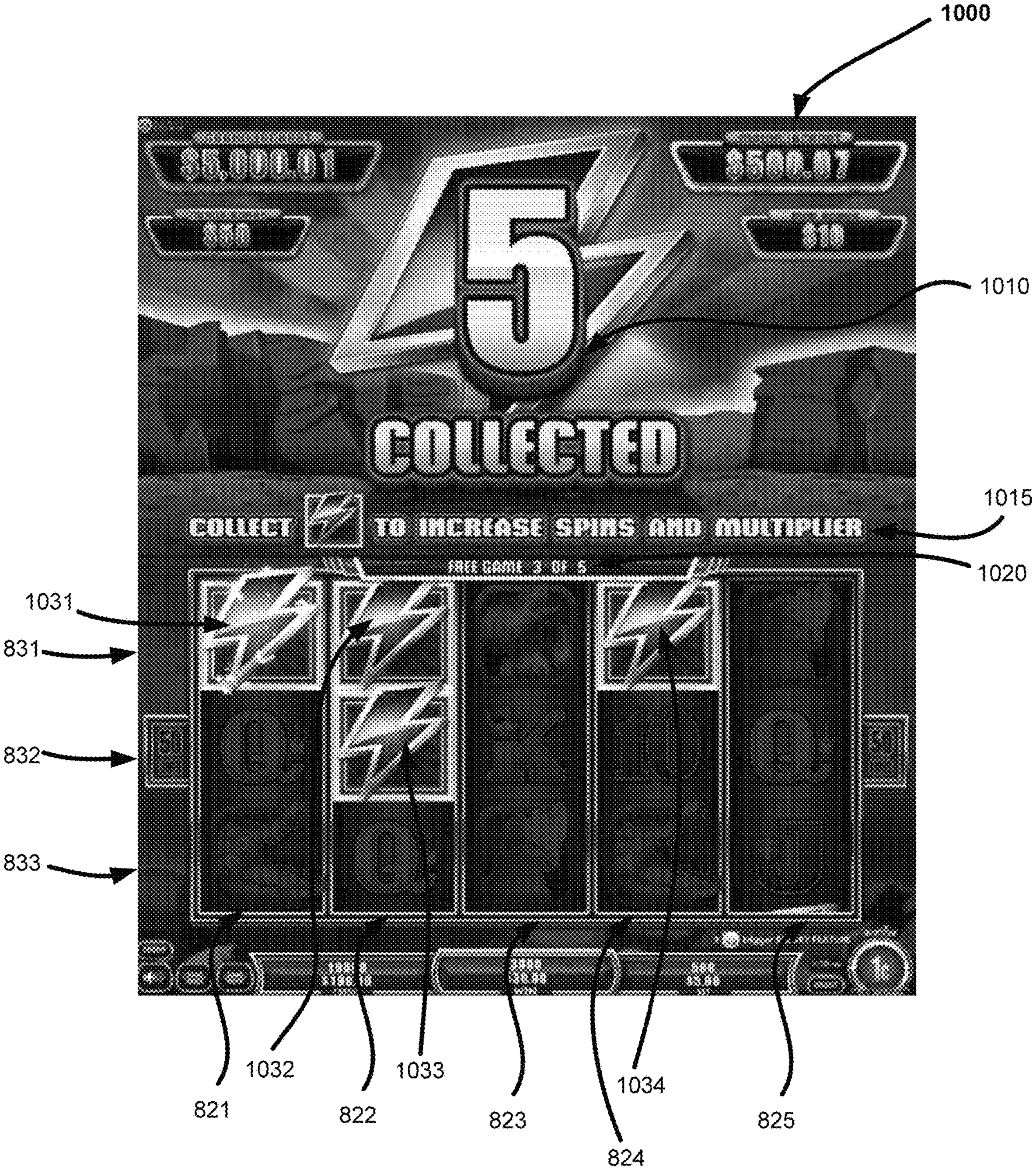

Upon the processor 204 determining at step 525 that the collection option has been selected, the processor 204 controls the display to display a transition animation to the screen of the collection feature such as screen 1000 shown in FIG. 10 and at step 540, the processor 204 sets a game counter to an initial number R which is 5 in the example of FIG. 9. Processor 204 also initializes a symbol counter as zero.

At step 545, processor 204 decrements the game counter by one.

At step 550, processor 204 selects symbols from collection symbol reel strips such as the example reel strips shown in FIG. 6 using the process described in relation to FIG. 4, above. In the example, reel strips 641-645 of FIG. 6, each reel strip position 601-630 is either occupied by a defined symbol, here represented by a "Scat2" symbol or is blank—i.e. not occupied by a symbol. As a result, for each symbol position, the outcome of the process of FIG. 4 will be that each symbol position will be occupied by a Scat symbol or will not be occupied.

The Scat2 symbol may be represented in any suitable way such as by the lightning bolt symbols 1031-1034 shown in FIG. 10. Similarly, the blank symbols may be represented in any suitable way, such as by the greyed-out symbols shown at symbol positions not occupied by lightning bolt symbols in FIG. 10, e.g. all of the symbol positions of the third column 823.

While the reels strips of FIG. 6 are shown as the same length as those of FIG. 3, they could be different lengths.

At step 552, the processor 204 determines if the selected symbols include any defined symbols (in the example, the lightning bolt symbol) and if so, updates the symbol counter by incrementing by the relevant number of defined symbols at step 554.

At step 556, the processor 204, determines whether the game counter has reached zero (i.e. whether all the game instances have been conducted) and if not reverts to step 545.

Referring again to FIG. 10, it shows an example screen display 1000 during a third free game of the awarded free games as indicated by free game counter message 1020. The screen display 1000 includes a prominent message 1010 indicating that five lightning bolt symbols have been collected in total including the four lightning bolt symbols 1031-1034 selected in the third free game. That is, the four lightning bolt symbols 1031-1034 have resulted in the symbol counter being updated by processor 204 from 1 to 5 at step 554 in this iteration. A further message 1015 indicates to the player that the aim is to "Collect [lightning bolt symbols] to increase spins and multiplier."

When processor 204 determines at step 556 that the game instance counter has reached zero, the symbol counter will have a final value—i.e. a total number (T) of defined symbols. In the example shown in screen displays 1100, 1200, the final value of the defined symbol counter is six.

In this example, at step 557, the processor 204 determines a cap value (V) which defines a maximum awardable number of further game instances and a maximum multiplier from a total number (T) of defined symbols. In this example, V is the smaller of the total number of defined symbols collected as a result of carrying out steps 540 to 556 and a defined maximum value, in this example 20. In other examples, there may be no defined maximum value and V=T.

At step, 558, the processor 204 selects a set of game option variants by mapping the determined cap value to one of a plurality of sets of game option variants stored as weighted tables in memory 208. Each game option variant specifies a number of further game instances (N) and a multiplier (M). Each variant has an associated probability (P) of the variant being selected. Each value of N and each value of M is an integer less than or equal to V. Each set of game option variants is configured such that $\Sigma_{i=1}^{S}(P_i M_i N_i)=V$, where S is the number of variants in the set of game option variants. This mechanism enable, a large number of variants to be selected from as described below and provides a possibility of awarding both the highest number of free game instances corresponding to the cap value and the largest multiplier while on average the number of free games time the multiplier will equal V, thus allowing the return to player from the further free games to conform to an average value.

An example set of game option variants is shown in Table 1 for a case where four defined symbols are collected. The columns show different combinations of multiplier and free games as well as a weight. Each individual weight defines a relative probability of a variant being selected based on the total of all the weights, here 3011. That is a weight of 50 gives a probability of 50/3011=0.161 for the associated variant (multiplier value plus number of free games (to be selected.

TABLE 1

| | 4 symbols collected | |
|---|---|---|
| Weight | Multiplier | Free Games |
| 50 | 1 | 1 |
| 150 | 1 | 2 |
| 300 | 1 | 3 |
| 38 | 1 | 4 |
| 150 | 2 | 1 |
| 1426 | 2 | 2 |
| 227 | 2 | 3 |
| 26 | 2 | 4 |
| 300 | 3 | 1 |
| 250 | 3 | 2 |
| 20 | 3 | 3 |
| 4 | 3 | 4 |
| 38 | 4 | 1 |
| 26 | 4 | 2 |
| 4 | 4 | 3 |
| 2 | 4 | 4 |
| 3011 | | |

Figure 11:
Figure 12:
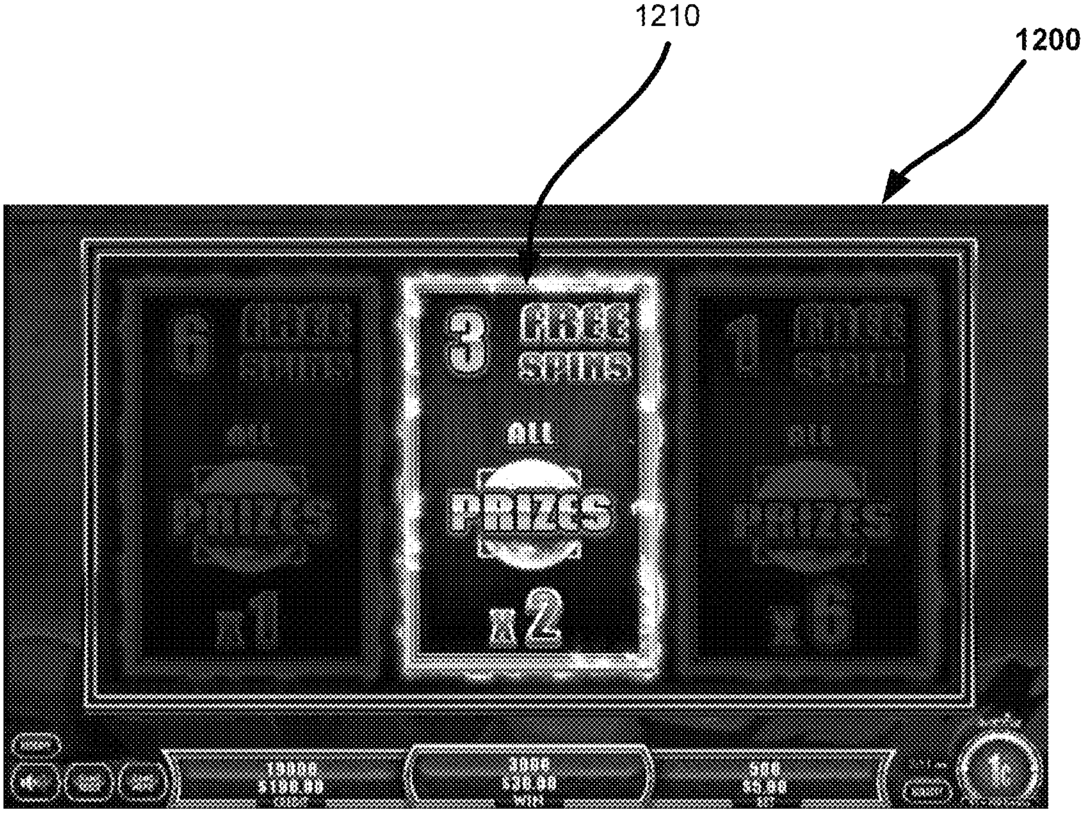

At step 560, the processor 204 controls the display to display two or more game options including a random selection option and at least one other option where M*N=V. An example of such as screen display 1100 is shown in FIG. 11. Screen display 1100 includes a message "6 collected, select an option to play" 1110 and three selectable options 1121,1122,1123. The first selectable option 1121 is 6 free spins where all prizes are awarded with a ×1 multiplier (i.e. at face value. The second selectable option 1122 is the random selection option which has the message "Mystery Choice: mystery number of free spins & multiplier." The third selectable option is one free spin with all prizes having a ×6 multiplier. The first option 1121 and third option 1123 having the maximum number of spins and the maximum multiplier respectively assists to communicate the possible outcomes that may result from selecting the random selection option 1122. In selected embodiments, the game option variant table may provide an integer value of a multiplier (in some examples, from a range of integers inclusive of a range of multiplier values from which a player could select (such as between the multiplier values and 1121 and 1123 of FIG. 11, discussed above). Similarly, in selected embodiments (which may be the same as the selected embodiments of the preceding sentence), the game option variant table may also provide, in selected examples, an integer value inclusive of a range of free spins (such as those that may be selected, such as at 1121 and 1123). In other examples, the range of integers for each of the multiplier values and the free spin values may be greater or lesser than the options for either value presented to the player for selection at 560.

If the player selects (at 562) the random selection option 1122, then in response to that selection, at step 564, the processor 204 randomly selects a game option variant from the relevant table of game option variants based on the weightings. For example, by providing the weightings to a random number generator 212 and receiving a returned value that can be mapped to an option. After the processor 204 selects the game option variant, processor 204 updates display to show the selected game option variant, for example, in the portion of a screen display 1200 shown in FIG. 1200, the area 1210 corresponding the random selection option is updated to show the award of "3 free spins, all prizes ×2." In the event that the player selects a non-random option, instead of the selection at 564, the processor will proceed to set a multiplier based on the selected option, at 566.

Similar to the selection options discussed relative to FIG. 9, the above selection options determined at 564, and presented to a player, through an interface such as that of FIG. 11 are again intended to benefit player involvement and satisfaction from the game. Additionally, the selection options presented to the player allow the player to select from the known options, or take further risks on the randomly determined option. Thus, the players involvement in the game and therefore satisfaction from the gameplay, is enhanced, particularly when the randomly determined option has a relatively wide range of variability, determined as described herein.

The order of steps 558, 560, and 562 may be varied. For example, the cap value V provides sufficient information for processor 204 to display the selection screen as shown in FIG. 11. As a result, the processor may retrieve the game option variant table from memory 208 after the options have been presented on the display 240. For example, processor 204 may only obtain the game option variant table from memory 208 when the player selects the random option at step 562.

At step 566 the processor 204 sets the multiplier based on the selected option and at step 568 the processor 204 sets a further game counter based on the selected option.

At step 570, the processor 204 decrements the further game counter by one.

At step 574, the processor 204 generates a game outcome for the respective game instance. In an example, generating the game outcome comprises selecting one cash on reel symbol from a plurality of cash on reel symbols on a single reel strip. For example, FIG. 7 depicts an example configuration 700, for a single reel strip 741 wherein each symbol position 701 to 730 is occupied by a cash on reel symbol ("COR"). In this example, the symbols are configured with prizes using the process described above before a single symbol is selected using the process for selecting a reel strip position described in relation to FIG. 4 above. Thus, in this example, while FIG. 5B includes a step 574 of the processor 204 determining whether a prize will be awarded, this step is not needed in this example and the processor 204 may proceed directly to step 576 and apply the set multiplier to the prize amounts. In other examples the game outcome may not result in the award of a prize. Still other examples may implement a different mechanism to selecting a game outcome such as a pick-a-box mechanism.

Figure 13:
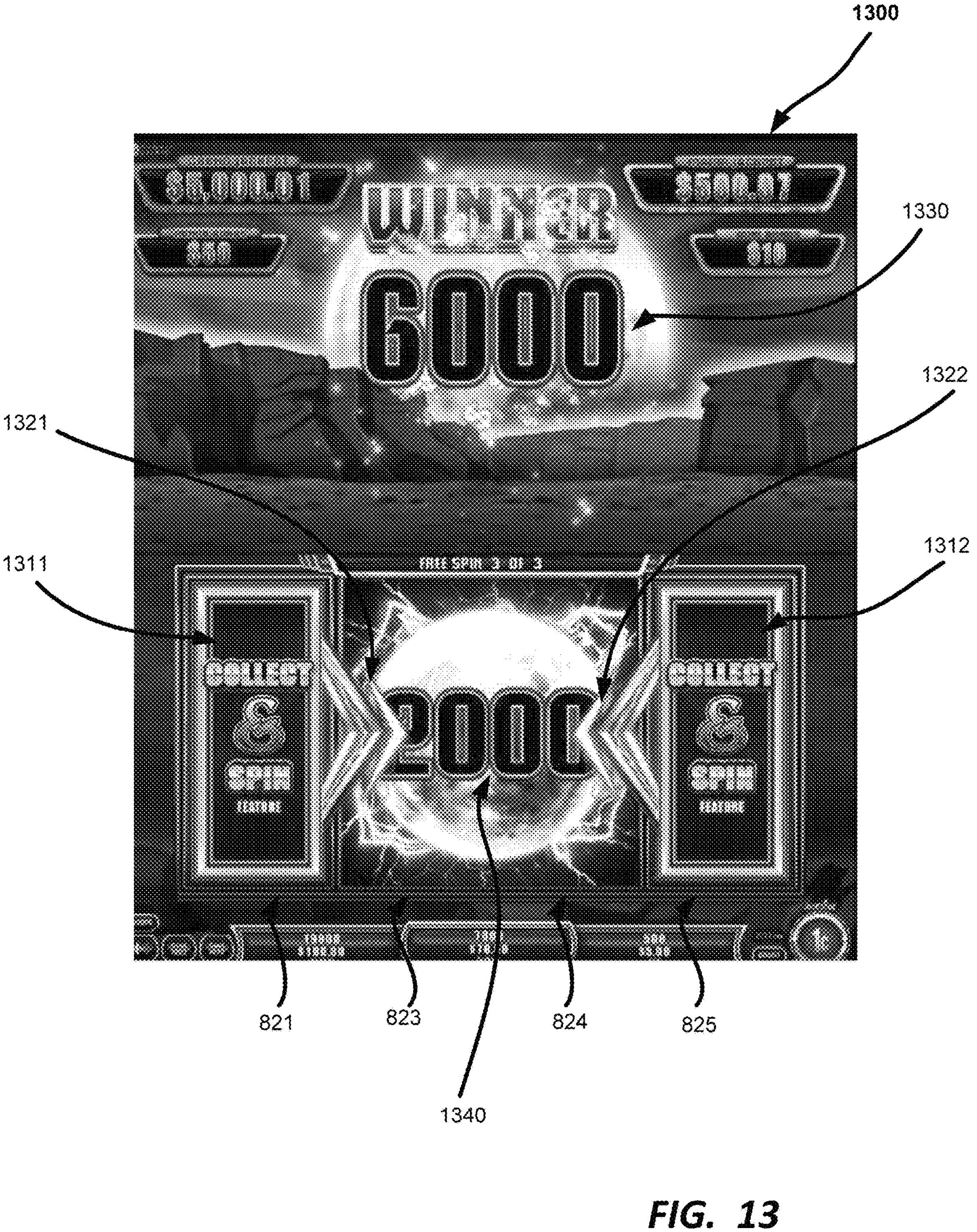

An example screen display 1300 for presenting the game outcome is shown in FIG. 13. In this example, first and fifth columns 821, 825 of symbol positions carry the message "collect & spin feature" 1311,1312 and have arrows 1321, 1322 to indicate where the prize will be awarded. Second to fourth columns have a single oversized cash on reels symbol 1340 carrying the value of 2000 credits. Prize award message 1330 indicates the player has been awarded 6000 credits based on a two times multiplier applied to (a) two 500-credit cash on reel symbols respectively selected during the first and second free spins (not shown), and (b) a 2000-credit cash on reel symbol selected during the third and last free spin (as shown in FIG. 13).

At step 578, the processor 204 determines whether the further game counter has reached zero and if not iterates through step 570 to 578 again. When the counter does reach zero, the further free games end 580.

While in the example embodiment, there are at least two selectable options (e.g. the three options shown in FIG. 9), in other examples, the gaming device may be configured to always select the composition of the additional game instances from the selected set of game option variants. That is, after collection of the defined symbols, a set of game variants is determined based on the number of defined symbols, the processor 204 sets the game variant to be used by selecting one of the determined set of game option variants without presenting the option to make a selection to the player.

Approaches described herein address the technical problem of how to control and present a feature game in which one of multiple options presented to a player includes multiple variables, in a manner consistent with a desired RTP; and particularly in in a context in which the variables are dependent upon preceding gameplay. For example, a number of designated configurable symbols during preceding gameplay may be used in defining inapplicable set of option variants. In terms of the technical effects of the described example solutions, a player is provided with the designated option as an alternative to multiple other options with known values for respective variables, providing an option to select an unknown gameplay. In examples in which the multiple variables are dependent upon an outcome of the preceding gameplay, the EGM will determine or reference a set of variants which correlate to the possible outcomes; in which the variants have associated probabilities consistent with the designated RTP.

In terms of technical effects, innovative aspects of selectively presenting gameplay according to a user-selectable option, wherein the option is determined represent improvements in the technical area of EGM software and provide new technology, in that they improve usability of EGMs by enhancing the user experience for players, extending player time on the EGMs, and maintaining the interest of current players in the EGMs. The optional gameplay with multiple variables may result in a greater reward than would be available to the player in the absence of the multiple variable option. Thus, controlling the system to provide the multiple variable option is a substantively different gameplay, not merely new game rules or new display patterns.

As a result, the multiple variable option allows a player to selectively increase game volatility while still maintaining a designated level of RTP for a game. This is accomplished by controlling the game to present a randomly selected variant of a set of variants, in which the probabilities of selection are controlled to maintain the designated RTP A typical electronic gaming device is a specially-configured computer system, and not merely a general-purpose computer. For example, one difference between a typical electronic gaming device and common processor-based computer system is that the electronic gaming device is designed to be a state-based system. In a state-based system, the system stores and maintains its current state in non-volatile memory, which can be implemented using battery-backed RAM, flash memory, a solid-state drive, or other persistent memory. Different functions of a game (e.g., bet, play, result, points in the graphical presentation, etc.) may be defined as a state. When a game moves from one state to another, data regarding the game state is stored in a custom non-volatile memory subsystem. In some cases, the gaming device does not advance from a current state to a subsequent state until information that allows the current state to be reconstructed is stored. In the event of a power failure or other malfunction, the gaming device will return to its current state when the power is restored by recovering state information from non-volatile memory. The restored state may include metering information and graphical information that was displayed on the gaming device in the state prior to the malfunction. For instance, if a player was shown an award for a game of chance and, before the award could be provided to the player, the power failed, the gaming device, upon the restoration of power, would return to the state where the award is indicated. More generally, the gaming device records, in non-volatile memory, the values of game parameters assigned during play, such as variables determined by an RNG or internal counters. (A game parameter, in general, can be one or more variables whose values govern play at the gaming device and depend on a random selection process.) The value of a game parameter can be recorded periodically, in response to some event such as user input, or whenever the value of the game parameter changes. This way, the gaming device can recover its state in case of a power failure or "tilt" event, allowing the gaming device to reconstruct events that have taken place before the power failure or "tilt" event. This requirement affects the software and hardware design on a gaming device. Game history information regarding previous games played, such as an amount wagered, the outcome of the game and so forth, may also be stored in a non-volatile memory device.

While the invention has been described with respect to the figures, it will be appreciated that many modifications and changes may be made by those skilled in the art without departing from the spirit of the invention Additionally, to further illustrate the methods and apparatus described herein, a non-limiting set of example embodiments are set forth below as numerically-identified Examples.

Example 1 is a gaming device comprising: a player interface; a display system comprising one or more display devices; a game controller comprising one or more processors, the game controller executing instructions which cause the game controller to: generate a first game outcome and corresponding display symbols, the first game outcome establishing a trigger condition; control a display system to present the first game outcome; after the trigger condition, establishing at least three player-selectable options for a feature stage, wherein a first selection option includes an identified number of game instances for the feature stage, wherein a second selection option includes an identified multiplier of an award value for the feature stage, and wherein a third selection option includes a random number of game instances for the feature stage and a random multiplier of an award for the feature stage; controlling a display system to present the three player selectable options; wherein to present a feature game in accordance with the third selection, the game controller will further, determine a cap value (V) which is both a maximum awardable number of further game instances and a maximum multiplier to apply to any awards made as a result of conduct of the further game instances from a total number (T) of defined symbols in outcomes of the feature stage instances, and select a set of game option variants by mapping the determined cap value to one of a plurality of sets of game option variants, wherein, for each set of game option variants, each variant specifies a number of further game instances (N) and a multiplier (M), each variant has an associated probability (P) of the variant being selected, in response to receiving selection of the third selection option through the player interface, control the display system to display the selected variants for N and M, and conduct the number of game instances (N) of the selected game option variant by applying the multiplier (M) of the selected game option variant to each winning outcome.

In Example 2, the subject matter of Example 1 wherein selecting a set of game option variants is performed in response to receiving selection of the third selection option through the player interface.

In Example 3, the subject matter of any one or more of Examples 1-2 wherein the set of game option variants is established wherein each value of N and each value of M is an integer less than or equal to V.

In Example 4, the subject matter of Example 3 the set of game option variants is configured such that each set of game option variants is configured such that $$\sum_{i=1}^{S}(P_iM_iN_i) = V,$$

where s is the number of variants in a respective set of game option variants.

In Example 5, the subject matter of any one or more of Examples 3-4 optionally include to V.

In Example 6, the subject matter of any one or more of Examples 2-5 wherein determining the cap value (V) is performed in response to the receiving selection of the third selection option through the player interface.

In Example 7, the subject matter of any one or more of Examples 1-6 wherein determining the cap value (V) is performed prior to the establishing of the at least three player-selectable options.

In Example 8, the subject matter of Example 7 wherein each of the first selection option and the second selection option are determined according to M*N=V.

In Example 9, the subject matter of Example 8 wherein the first selection option is configured with M=1.

In Example 10, the subject matter of any one or more of Examples 8-9 wherein the second selection option is configured with N=1.

In Example 11, the subject matter of any one or more of Examples 1-10 wherein the cap value (V) is set to the number (T) of defined symbols selected in the plurality of game outcomes.

In Example 12, the subject matter of any one or more of Examples 1-11 wherein the cap value (V) is set to the lower of a predefined maximum cap value and the number (T) of defined symbols selected in the plurality of game outcomes.

In Example 13, the subject matter of any one or more of Examples 1-12 wherein the cap value (V) is greater than the number (T) of defined symbols selected in the plurality of game outcomes.

In Example 14, the subject matter of any one or more of Examples 1-13 wherein each set of game option variants is defined by at least one weighted table stored in memory accessible to the game controller that defines each variant and the associated probability of the variant being selected.

In Example 15, the subject matter of any one or more of Examples 1-14 wherein selecting a set of game option variants comprises randomly selecting a game option variant from a table of game option variants.

In Example 16, the subject matter of Example 15 wherein selecting a set of game option variants comprises selecting a game option variant from the table of game option variants in response to a call from a random number generator.

In Example 17, the subject matter of any one or more of Examples 15-16 wherein the operations further comprise in response to the trigger condition, controlling the display system to present multiple options for a feature stage.

In Example 18, the subject matter of Example 17 wherein the multiple options for the feature stage comprise a collection option; and wherein the operations further comprise determining that the collection option has been selected from the multiple options for the feature stage.

In Example 19, the subject matter of Example 18 wherein response to determining that the collection option has been selected, presenting a collect and spin feature stage.

In Example 20, the subject matter of Example 19 optionally includes after the collect and spin feature stage, establishing the first, second, and third selection options.

Example 21 is a method of operating a gaming device, comprising a player interface, a display system comprising one or more display devices, and a game controller comprising one or more processors, comprising: generating a first game outcome and corresponding display symbols, the first game outcome establishing a trigger condition; controlling the display system to present the first game outcome; after the trigger condition, establishing at least three player-selectable options for a feature stage, wherein a first selection option includes an identified number of game instances for the feature stage, wherein a second selection option includes an identified multiplier of an award value for the feature stage, and wherein a third selection option includes a random number of game instances for the feature stage and a random multiplier of an award for the feature stage; controlling a display system to present the three player selectable options; wherein to present a feature game in accordance with the third selection, the game controller will further, determine a cap value (V) which is both a maximum awardable number of further game instances and a maximum multiplier to apply to any awards made as a result of conduct of the further game instances from a total number (T) of defined symbols in outcomes of the feature stage instances, and select a set of game option variants by mapping the determined cap value to one of a plurality of sets of game option variants, wherein, for each set of game option variants, each variant specifies a number of further game instances (N) and a multiplier (M), each variant has an associated probability (P) of the variant being selected, in response to receiving selection of the third selection option through the player interface, control the display system to display the selected variants for N and M, and conduct the number of game instances (N) of the selected game option variant by applying the multiplier (M) of the selected game option variant to each winning outcome.

In Example 22, the subject matter of Example 21 wherein selecting a set of game option variants is performed in response to receiving selection of the third selection option through the player interface.

In Example 23, the subject matter of any one or more of Examples 21-22 wherein the set of game option variants is established wherein each value of N and each value of M is an integer less than or equal to V.

In Example 24, the subject matter of Example 23 the set of game option variants is configured such that each set of game option variants is configured such that $$\sum_{i=1}^{S}(P_iM_iN_i) = V,$$

where S is the number of variants in a respective set of game option variants.

In Example 25, the subject matter of any one or more of Examples 23-24 optionally include to V.

In Example 26, the subject matter of any one or more of Examples 22-25 wherein determining the cap value (V) is performed in response to the receiving selection of the third selection option through the player interface.

In Example 27, the subject matter of any one or more of Examples 21-26 wherein determining the cap value (V) is performed prior to the establishing of the at least three player-selectable options.

In Example 28, the subject matter of Example 27 wherein each of the first selection option and the second selection option are determined according to M*N=V.

In Example 29, the subject matter of Example 28 wherein the first selection option is configured with M=1.

In Example 30, the subject matter of any one or more of Examples 28-29 wherein the second selection option is configured with N=1.

In Example 31, the subject matter of any one or more of Examples 21-30 wherein the cap value (V) is set to the number (T) of defined symbols selected in the plurality of game outcomes.

In Example 32, the subject matter of any one or more of Examples 21-31 wherein the cap value (V) is set to the lower of a predefined maximum cap value and the number (T) of defined symbols selected in the plurality of game outcomes.

In Example 33, the subject matter of any one or more of Examples 21-32 wherein the cap value (V) is greater than the number (T) of defined symbols selected in the plurality of game outcomes.

In Example 34, the subject matter of any one or more of Examples 21-33 wherein each set of game option variants is defined by at least one weighted table stored in memory accessible to the game controller that defines each variant and the associated probability of the variant being selected.

In Example 35, the subject matter of any one or more of Examples 21-34 wherein selecting a set of game option variants comprises randomly selecting a game option variant from a table of game option variants.

In Example 36, the subject matter of any one or more of Examples 25-35 wherein selecting a set of game option variants comprises selecting a game option variant from the table of game option variants in response to a call from a random number generator.

In Example 37, the subject matter of any one or more of Examples 25-36 wherein the operations further comprise in response to the trigger condition, controlling the display system to present multiple options for a feature stage.

In Example 38, the subject matter of Example 37 wherein the multiple options for the feature stage comprise a collection option; and wherein the operations further comprise determining that the collection option has been selected from the multiple options for the feature stage.

In Example 39, the subject matter of Example 38 wherein response to determining that the collection option has been selected, presenting a collect and spin feature stage.

In Example 40, the subject matter of Example 39 optionally includes after the collect and spin feature stage, establishing the first, second, and third selection options.

Example 41 is one or more non-transitory storage devices having instructions stored thereon wherein the instructions, when executed cause one or more devices to perform operations, including: generating a first game outcome and corresponding display symbols, the first game outcome establishing a trigger condition; controlling a display system to present the first game outcome; after the trigger condition, establishing at least three player-selectable options for a feature stage, wherein a first selection option includes an identified number of game instances for the feature stage, wherein a second selection option includes an identified multiplier of an award value for the feature stage, and wherein a third selection option includes a random number of game instances for the feature stage and a random multiplier of an award for the feature stage; controlling a display system to present the three player selectable options; presenting a feature game in accordance with the third selection, comprising, determining a cap value (V) which is both a maximum awardable number of further game instances and a maximum multiplier to apply to any awards made as a result of conduct of the further game instances from a total number (T) of defined symbols in outcomes of the feature stage instances, and selecting a set of game option variants by mapping the determined cap value to one of a plurality of sets of game option variants, wherein, for each set of game option variants, each variant specifies a number of further game instances (N) and a multiplier (M), each variant has an associated probability (P) of the variant being selected, in response to receiving selection of the third selection option through the player interface, controlling the display system to display the selected variants for N and M, and conducting the number of game instances (N) of the selected game option variant by applying the multiplier (M) of the selected game option variant to each winning outcome.

In Example 42, the subject matter of Example 41 wherein selecting a set of game option variants is performed in response to receiving selection of the third selection option through the player interface.

In Example 43, the subject matter of any one or more of Examples 41-42 wherein the set of game option variants is established wherein each value of N and each value of M is an integer less than or equal to V.

In Example 44, the subject matter of Example 43 the set of game option variants is configured such that each set of game option variants is configured such that $$\sum_{i=1}^{S}(P_i M_i N_i) = V,$$

where S is the number of variants in a respective set of game option variants.

In Example 45, the subject matter of any one or more of Examples 43-44 optionally include to V.

In Example 46, the subject matter of any one or more of Examples 42-45 wherein determining the cap value (V) is performed in response to the receiving selection of the third selection option through the player interface.

In Example 47, the subject matter of any one or more of Examples 41-46 wherein determining the cap value (V) is performed prior to the establishing of the at least three player-selectable options.

In Example 48, the subject matter of Example 47 wherein each of the first selection option and the second selection option are determined according to M*N=V.

In Example 49, the subject matter of Example 48 wherein the first selection option is configured with M=1.

In Example 50, the subject matter of any one or more of Examples 48-49 wherein the second selection option is configured with N=1

In Example 51, the subject matter of any one or more of Examples 41-50 wherein the cap value (V) is set to the number (T) of defined symbols selected in the plurality of game outcomes.

In Example 52, the subject matter of any one or more of Examples 41-51 wherein the cap value (V) is set to the lower of a predefined maximum cap value and the number (T) of defined symbols selected in the plurality of game outcomes.

In Example 53, the subject matter of any one or more of Examples 41-52 wherein the cap value (V) is greater than the number (T) of defined symbols selected in the plurality of game outcomes.

In Example 54, the subject matter of any one or more of Examples 41-53 wherein each set of game option variants is defined by at least one weighted table stored in memory accessible to the game controller that defines each variant and the associated probability of the variant being selected.

In Example 55, the subject matter of any one or more of Examples 41-54 wherein selecting a set of game option variants comprises randomly selecting a game option variant from a table of game option variants.

In Example 56, the subject matter of any one or more of Examples 45-55 wherein selecting a set of game option variants comprises selecting a game option variant from the table of game option variants in response to a call from a random number generator.

In Example 57, the subject matter of any one or more of Examples 45-56 wherein the operations further comprise in response to the trigger condition, controlling the display system to present multiple options for a feature stage.

In Example 58, the subject matter of Example 57 wherein the multiple options for the feature stage comprise a collection option; and wherein the operations further comprise determining that the collection option has been selected from the multiple options for the feature stage.

In Example 59, the subject matter of Example 58 wherein response to determining that the collection option has been selected, presenting a collect and spin feature stage.

In Example 60, the subject matter of Example 59 optionally includes after the collect and spin feature stage, establishing the first, second, and third selection options.

Many additional variations may be made beyond the enumerated Examples above. For example, when a single device, component, structure, or article is described herein, more than one device, component, structure, or article (whether or not they cooperate) may alternatively be used in place of the single device, component or article that is described. Accordingly, the functionality that is described as being possessed by a device may alternatively be possessed by more than one device, component, or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other embodiments within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise.

For the sake of presentation, the detailed description uses terms like "determine" and "select" to describe computer operations in a computer system. These terms denote operations performed by a computer, and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to insure privacy and prevent fraud in any of a variety of ways well known in the art.

It will be readily apparent that the various methods and algorithms described herein may be implemented by, e.g., appropriately programmed general-purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input, and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

The present disclosure provides, to one of ordinary skill in the art, an enabling description of several embodiments and/or innovations. Some of these embodiments and/or innovations may not be claimed in the present application, but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a gaming market, embodiments of the present disclosure can be implemented for other markets. The gaming system environment of the examples is not intended to suggest any limitation as to the scope of use or functionality of any aspect of the disclosure.

Any variation and derivation from the above description and figures are included in the scope of the present invention as defined by the claims.

What is claimed is:

1. A gaming device comprising:

a player interface;

a display system comprising one or more display devices; and a game controller comprising one or more processors, the game controller executing instructions which cause the game controller to:

determine a cap value (V), which is both a maximum potential number of additional game instances and a maximum multiplier to apply to any outcomes of the additional game instances, wherein the cap value is determined based on a total number (T) of defined symbols in outcomes of the game instances for a feature stage, select a set of game option variants from a plurality of sets of game option variants by mapping the determined cap value to one of a plurality of sets of game option variants, wherein, for each set of game option variants, each game option variant specifies a number of additional game instances (N) and a multiplier (M) such that a return to player for the number of additional game instances for each set of game option variants conforms to an average value, randomly select a particular game option variant from the selected set of game option variants, and conduct a particular number of additional game instances (N) of the selected particular game option variant by applying the multiplier (M) of the selected game option variant to each outcome of the particular number of additional game instances.

2. The gaming device of claim 1, wherein each game option variant has an associated probability (P) of the game option variant being selected.

3. The gaming device of claim 2, wherein mapping the determined cap value to one of a plurality of sets of game option variants comprises selecting a game option variant table comprising the set of game option variants.

4. The gaming device of claim 1, wherein the particular game option is selected in response to a user selection via the player interface of a random selection option from among a set of selection options comprising the random selection option and at least one identified selection option.

5. The gaming device of claim 4, wherein the at least one identified selection identifies, via the display system, at least one of an identified number of game instances and an identified multiplier.

6. The gaming device of claim 1, wherein a game counter is decremented for each of the particular number of game instances.

7. The gaming device of claim 1, further comprising instructions to cause the game controller to:

control the display system to present the N and M values for the game option variant.

8. A non-transitory computer readable medium comprising computer readable code executable by one or more game controllers to:

determine a cap value (V), which is both a maximum potential number of additional game instances and a maximum multiplier to apply to any outcomes of the additional game instances, wherein the cap value is determined based on a total number (T) of defined symbols in outcomes of the game instances for a feature stage, select a set of game option variants from a plurality of sets of game option variants by mapping the determined cap value to one of a plurality of sets of game option variants, wherein, for each set of game option variants, each game option variant specifies a number of additional game instances (N) and a multiplier (M) such that a return to player for the number of additional game instances for each set of game option variants conforms to an average value, randomly select a particular game option variant from the selected set of game option variants, and conduct a particular number of additional game instances (N) of the selected particular game option variant by applying the multiplier (M) of the selected game option variant to each outcome of the particular number of additional game instances.

9. The non-transitory computer readable medium of claim 8, wherein each game option variant has an associated probability (P) of the game option variant being selected.

10. The non-transitory computer readable medium of claim 9, wherein mapping the determined cap value to one of a plurality of sets of game option variants comprises selecting a game option variant table comprising the set of game option variants.

11. The non-transitory computer readable medium of claim 8, wherein the particular game option is selected in response to a user selection via a player interface of a random selection option from among a set of selection options comprising the random selection option and at least one identified selection option.

12. The non-transitory computer readable medium of claim 11, wherein the at least one identified selection identifies, via a display system, at least one of an identified number of game instances and an identified multiplier.

13. The non-transitory computer readable medium of claim 8, wherein a game counter is decremented for each of the particular number of game instances.

14. The non-transitory computer readable medium of claim 8, further comprising instructions to cause the one or more game controllers to:

control a display system to present the N and M values for the game option variant.

15. A method comprising:

determining a cap value (V), which is both a maximum potential number of additional game instances and a maximum multiplier to apply to any outcomes of the additional game instances, wherein the cap value is determined based on a total number (T) of defined symbols in outcomes of the game instances for a feature stage, selecting a set of game option variants from a plurality of sets of game option variants by mapping the determined cap value to one of a plurality of sets of game option variants, wherein, for each set of game option variants, each game option variant specifies a number of additional game instances (N) and a multiplier (M) such that a return to player for the number of additional game instances for each set of game option variants conforms to an average value, randomly selecting a particular game option variant from the selected set of game option variants, and conducting a particular number of additional game instances (N) of the selected particular game option variant by applying the multiplier (M) of the selected game option variant to each outcome of the particular number of additional game instances.

16. The method of claim 15, wherein each game option variant has an associated probability (P) of the game option variant being selected.

17. The method of claim 16, wherein mapping the determined cap value to one of a plurality of sets of game option variants comprises selecting a game option variant table comprising the set of game option variants.

18. The method of claim 15, wherein particular game option is selected in response to a user selection via a player interface of a random selection option from among a set of selection options comprising the random selection option and at least one identified selection option.

19. The method of claim 18, wherein the at least one identified selection identifies, via a display system, at least one of an identified number of game instances and an identified multiplier.

20. The method of claim 15, wherein a game counter is decremented for each of the particular number of game instances.

* * * * *